US006837660B2

(12) United States Patent
Schmich

(10) Patent No.: US 6,837,660 B2
(45) Date of Patent: Jan. 4, 2005

(54) FIXING DEVICE ON A MOUNTING PLATE

(75) Inventor: Franz Schmich, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/276,132

(22) PCT Filed: Mar. 13, 2002

(86) PCT No.: PCT/DE02/00881
§ 371 (c)(1),
(2), (4) Date: Apr. 16, 2003

(87) PCT Pub. No.: WO02/075169
PCT Pub. Date: Sep. 26, 2002

(65) Prior Publication Data
US 2003/0161701 A1 Aug. 28, 2003

(30) Foreign Application Priority Data
Mar. 15, 2001 (DE) .......................................... 101 12 425

(51) Int. Cl.[7] .............................................. F16B 43/02
(52) U.S. Cl. ........................ 411/546; 411/82; 411/535; 411/930; 403/256; 403/41
(58) Field of Search ................................ 411/546, 535, 411/536, 930, 82, 82.1, 258, 171, 107; 403/256–268, 270–272, 187, 188, 41

(56) References Cited

U.S. PATENT DOCUMENTS

| 1,344,417 | A | * | 6/1920 | Lovekin | 411/535 |
| 3,434,743 | A | * | 3/1969 | Boeker | 285/39 |
| 4,010,519 | A | * | 3/1977 | Worthing | 403/404 |
| 4,433,930 | A | * | 2/1984 | Cosenza | 403/12 |
| 4,493,577 | A | * | 1/1985 | Cosenza | 403/41 |
| 4,934,887 | A | * | 6/1990 | Sharp et al. | 411/339 |

FOREIGN PATENT DOCUMENTS

DE          197 26 750          1/1999

* cited by examiner

Primary Examiner—Flemming Saether
(74) Attorney, Agent, or Firm—Kenyon & Kenyon

(57) ABSTRACT

A fastening device on a support panel, having at least one structural element, is to be designed in such a way that under predefined tightening of the fastening device on the support panel no lasting damage occurs. To achieve this, a holding part of the fastening device has a step at a point of connection with the support panel, and a spacer of the fastening device has a double bushing having an outer sleeve and an inner sleeve. The two sleeves are positioned with respect to each other in such a way that when the fastening device is tightened the inner bushing comes into contact with the step and the indentation of the support panel into the spacer is limited. The fastening device is preferably intended for use in the automobile industry.

7 Claims, 2 Drawing Sheets

FIXING DEVICE ON A MOUNTING PLATE

FIELD OF THE INVENTION

The present invention relates to a fastening device on a support (carrier or sheet-metal) panel, in particular on a body of a motor vehicle. The fastening device has a holding part in the form of a threaded bolt welded to a mounting side of the support panel, a spacer in the form of a bushing which may be placed over part of the length of the holding part, and a clamping element corresponding to the holding part in the form of a nut. In addition, the component which is to be attached is also placed in the fastening device.

BACKGROUND INFORMATION

Fastening devices are known in many variants. The spacer has the purpose in particular of decoupling the contact surface for a component to be attached by the fastening device, which may be a sensor housing for example, from the possibly curved shape of the support panel, which is oriented for example according to aesthetic requirements of an auto body.

To provide for a particularly economical operation of motor vehicles, efforts are made to build them in a light-weight manner. This also has effects on the body, in that the latter is manufactured of the thinnest sheet metal possible. The problem can then occur that the body is plastically deformed in the area of the bushing due to the tightening torque of the clamping element to achieve the prescribed fastening force for the structural element, and is partially drawn into the bushing.

As a result of this unintended indentation, with surface coated support panels, for example painted auto bodies, the surface coating on the external side opposite the mounting side can become cracked in an unwanted manner, which later constitutes a potential rust location at this position.

SUMMARY OF THE INVENTION

The fastening device according to the present invention has the advantage over the related art that the aforementioned deficiencies are avoided.

To achieve this, the fastening device has a holding part with a step, and a spacer in the form of a double bushing, having an outer sleeve and an inner sleeve. The positioning of the inner sleeve with respect to the outer sleeve is coordinated in such a way that when the fastening device is clamped with a required tightening torque using a clamping element, the indentation of the support panel into the spacer is limited by the inner sleeve coming to rest against a step of the holding part.

That causes the deformation of the support panel to remain within an accepted range, in which a surface coating of the support panel remains undamaged. The danger of corrosion of the support panel as a result of mounting the fastening device is thus avoided.

DETAILED DESCRIPTION

Figure 1:
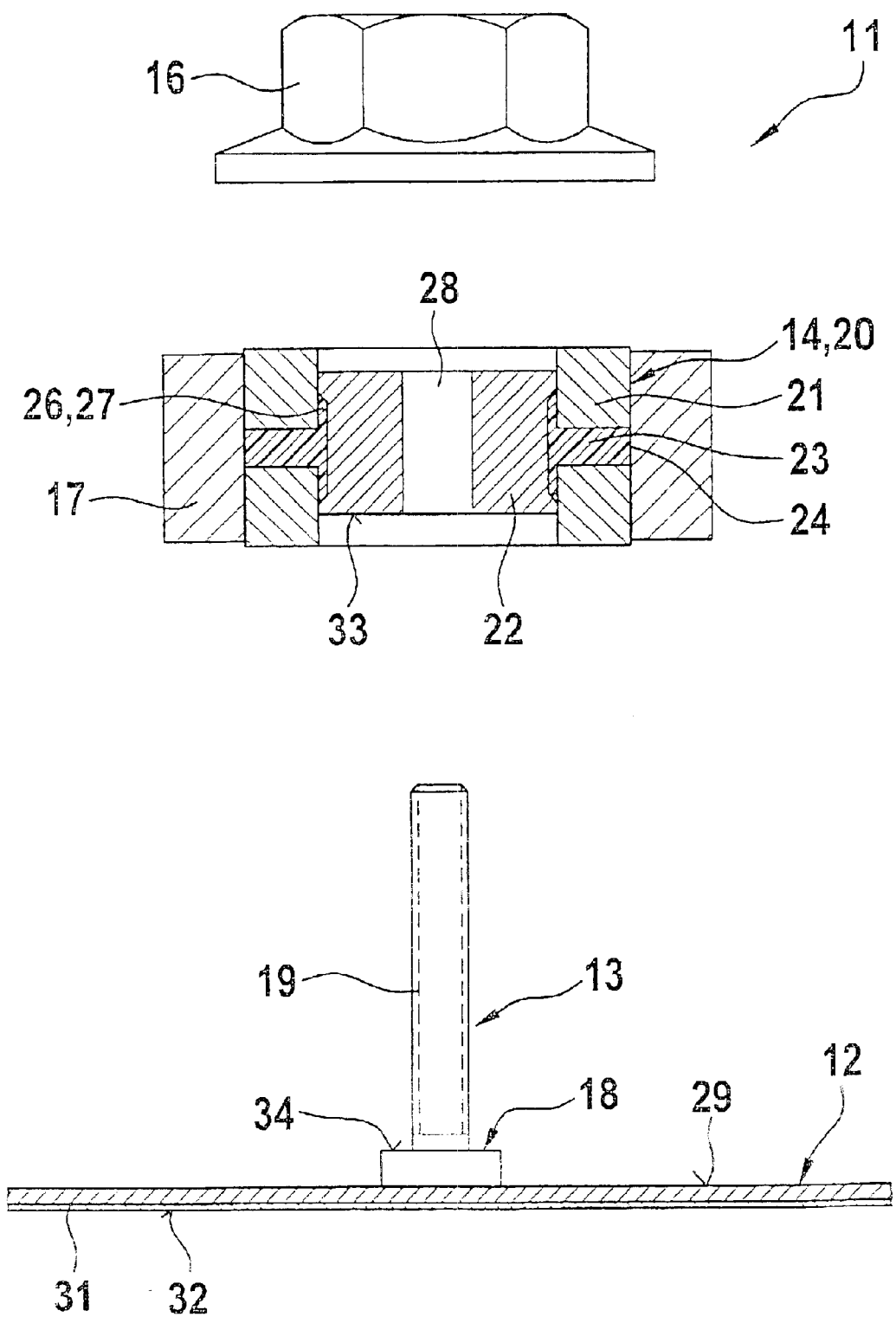
FIG. 1 shows the fastening device with the parts separated from each other in a partially sectional side view.
Figure 2:
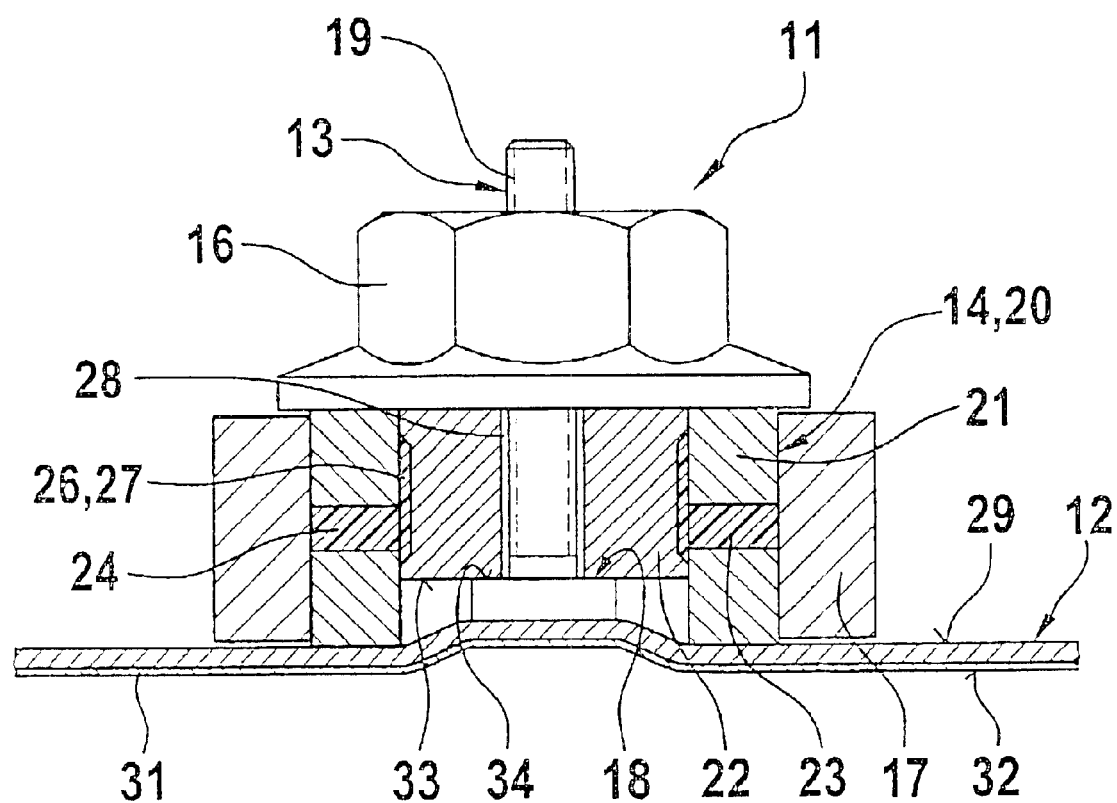
FIG. 2 shows the fastening device in the assembled state in a partially sectional side view.

A fastening device 11 shown in FIGS. 1, 2 is mounted on a support panel 12 as part of a body of a motor vehicle.

Fastening device 11 has a holding part 13, a spacer 14, and a clamping element 16; it is used to attach a structural element (component) 17.

Holding part 13 is designed as a stud bolt, one end of which is welded perpendicular to support panel 12. Holding part 13 has a step 18 in this area, larger than the rest of its cross section. In the other area the holding part has a thread 19.

Spacer 14 is implemented as a double bushing 20, made up of an outer sleeve 21 and an inner sleeve 22. The relative positions of sleeves 21, 22 with respect to each other is determined by a filling material 23 inserted into spacer 14. For this purpose, outer sleeve 21 has four supply orifices 24 in the form of punched holes piercing the wall of outer sleeve 21.

Curable plastic is inserted through these supply orifices 24 into spacer 14 as filling material 23 using an injection tool. Filling material 23 flows into a cavity 26 of outer sleeve 21, and into receiving chambers 27 in the form of elongated slots in inner sleeve 22. After filling material 23 solidifies, a form-closure is created between sleeves 21, 22 which fixes inner sleeve 22 in the predetermined position with respect to outer sleeve 21.

Clamping element 16 is implemented in the form of a nut, whose inner thread corresponds to thread 19 of holding part 13. The nut may be supplemented on its contact side by an underlayment such as a washer or a toothed lock washer.

Structural element 17 is a sensor housing having attaching flanges. In FIGS. 1, 2, structural element 17 is represented only by a section of an attaching flange in which spacer 14 is embedded. Inner sleeve 22 of spacer 14 has a lead-through 28 whose internal width is greater than the cross section of holding part 13 in the area of its thread 19 by enough free-play for movement.

When fastening device 11 is put together, structural element 17 is placed on holding part 13 using spacer 14, so that outer sleeve 21, whose inner width is greater than the cross section of holding part 13 in the area of step 18, rests with its face against support panel 12. This side of support panel 12 constitutes a mounting side 29, while the other side of support panel 12 constitutes an external side 32 provided with a surface coating 31. Alternatively, mounting side 29 may also have a surface coating 31.

In this basic position of pre-mounted spacer 14 on support panel 12, inner sleeve 22 has a face 33 which is turned toward mounting side 29, spaced at a predetermined distance from an opposite contact side 34 of step 18 of holding part 13.

Clamping element 16 is screwed onto the free remaining part of holding part 13 which protrudes from spacer 14, until it is in contact with spacer 14.

In a screwing procedure which is continued until the requisite tightening torque is reached, fastening device 12 is tightened, so that face 33 of inner sleeve 22 comes into contact with contact side 34 of step 18 and the beginning indentation of support panel 12 into spacer 14 is limited to an acceptable measure within the elastic deformation of support panel 12, so that surface coating 31 in the form of a paint layer still remains undamaged.

With this slight deformation of support panel 12, intentionally regulated by the design of spacer 14 and the height of step 18 of holding part 13, structural element 17 is held securely and fastening device 11 is fixed in the functional position without endangering surface coating 31 of support panel 12.

What is claimed is:

1. A fastening device on a support panel, comprising:

a holding part anchored on a mounting side of the support panel, the holding part having at least one step;

at least one structural element having a spacer, the spacer at least partially surrounding part of a length of the holding part, the spacer including a double bushing composed of an outer sleeve and an inner sleeve;

a clamping element situated on the holding part a filling material introduced into the double bushing and fixing relative positions of the outer and inner sleeves with respect to each other in such a way that, given a fully assembled fastening device, in response to a tightening of the clamping element, a deformation of the support panel is limited by the outer sleeve resting thereon when the inner sleeve comes to rest against the step of the holding part; and;

wherein the spacer being located between the mounting side and the clamping element.

2. The fastening device according to claim 1, wherein the holding part includes a stud bolt and is joined at one end to the support panel in an integral connection, and wherein, in an area of the joining, the step constitutes an enlargement of a remaining cross-section of the holding part.

3. The fastening device according to claim 2, wherein, in an area facing away from the step, the holding part has a thread onto which a clamping element in the form of a nut is screwed.

4. The fastening device according to claim 3, wherein the outer sleeve has supply orifices through which the filling material is introduced into a cavity of the outer sleeve and into receiving chambers.

5. The fastening device according to claim 4, wherein the filling material is a curable plastic which produces a positive engagement between the sleeves.

6. The fastening device according to claim 5, wherein an inside width of the outer sleeve is greater than a cross-sectional area of the holding part in an area of the step, and when the spacer is placed on the holding part, the outer sleeve passes by the step and comes to rest against the mounting side of the support panel.

7. The fastening device according to claim 6, wherein, after the spacer has been placed on the holding part and when the outer sleeve is resting against the mounting side of the support panel, a face of the inner sleeve is spaced at a distance from a contact side of the step by a measure which corresponds to an acceptable deformation of a surface coating of the support panel.

* * * * *